UNITED STATES PATENT OFFICE.

R. D'HEUREUSE, OF SAN FRANCISCO, CALIFORNIA.

IMPROVED MODE OF FERMENTING LIQUIDS FOR DISTILLATION AND OTHER PURPOSES.

Specification forming part of Letters Patent No. 67,512, dated August 6, 1867.

*To all whom it may concern:*

Be it known that I, RUDOLPH D'HEUREUSE, of the city and county of San Francisco, State of California, have invented a new and improved mode or process to regulate the fermentation of mash, wash, or vinous fluid preparatory to distilling the same, and of other substances requiring fermentation; and I do hereby declare that the following is a full, clear, and exact description of the same.

This invention consists in the introduction of air into the mash, wash, or other substance from below, so that the oxygen of that air may assist the progress of fermentation, while the temperature of the introduced air is essential to regulate the fermentation. The air passing upward through the fermenting mass at the same time agitates the fluid, and every particle of the whole will be exposed to the oxidizing effect more equally than being left undisturbed. It is also claimed that in those classes of fermentation in which yeast is added to stimulate the fermentation the yeast effects a gentle agitation in those parts coming in contact with it, and thereby of the whole mass; but being mixed more or less equally through the mass, the action will not take place as equally as would be the case where the same is gently agitated and the oxidizing agent of the air brought in contact with every part thereof; that therefore the fermentation will be rendered more complete and the yield of the same quantity of mash or other substance in alcohol materially increased, the required quantity of yeast reduced; also, by closing the tops of the fermenting-tubs at a certain state of fermentation and turning the air passed through the liquid saturated with the generated alcoholic vapors thereof into proper condensing apparatus, a saving of alcohol will be effected; and last, though not least, by regulating the supply, temperature, and moisture of the introduced air the whole process of fermentation can be kept under the most perfect control and rendered entirely independent from the climate or season of the year. A higher temperature will accelerate, a lower retard, and if sufficiently low entirely prevent any progress in the fermentation.

To enable those skilled in the art to understand and use my invention, I shall proceed to describe the same.

A pipe or pipes of gutta-percha or other suitable material and suitable shape is so arranged that its termination rests at or near the bottom in the fermenting-tub, and is there perforated in a manner so as to admit air forced or urged from the other end into the pipes as much divided as possible into the fermenting substance. The air may be forced or urged through by means of bellows, fans, or other contrivance, and warmed or cooled, dried or moistened, previously to entering the pipe or pipes aforesaid, as may be required.

Having thus described my invention, I do not claim the application of a higher or lower temperature to the fermenting substance to suit the requirements, and thereby regulate the progress of the fermentation, as that is not new.

What I claim as new, and desire to secure by Letters Patent, is—

The introduction of air of the proper temperature and moisture and in the proper quantity into the fermenting substance from below, for the purpose of more thoroughly fermenting the whole mass and to control the progress of fermentation, substantially in the manner described and set forth.

Signed by me this 18th day of March, A. D. 1867.

R. D'HEUREUSE.

Witnesses:
 E. V. SUTTEN,
 E. F. OHM.